Sept. 6, 1966   O. J. B. ORWIN   3,270,844
OVERLOAD CLUTCH OR TORQUE LIMITING DEVICE
Filed July 24, 1964   3 Sheets—Sheet 1

INVENTOR.
OLAF JOHN BARCLAY ORWIN
By
agent

Sept. 6, 1966  O. J. B. ORWIN  3,270,844
OVERLOAD CLUTCH OR TORQUE LIMITING DEVICE
Filed July 24, 1964  3 Sheets-Sheet 2

INVENTOR.
OLAF JOHN BARCLAY ORWIN

INVENTOR.
OLAF JOHN BARCLAY ORWIN

United States Patent Office 3,270,844
Patented Sept. 6, 1966

3,270,844
OVERLOAD CLUTCH OR TORQUE LIMITING DEVICE
Olaf John Barclay Orwin, Birmingham, England, assignor to Fisher & Ludlow Limited, Tipton, England, a British company
Filed July 24, 1964, Ser. No. 384,838
Claims priority, application Great Britain, July 30, 1963, 30,091/63
6 Claims. (Cl. 192—56)

This invention relates to over-load clutches or torque limiting devices, herein referred to by the expression overload clutch, and which are of the kind, hereinafter referred to as the kind specified, comprising driving and driven clutch elements mounted in side by side relationship for rotation about a common axis, said two clutch elements having oppositely directed faces each of which is provided with a plurality of ball engaging, torque transmitting openings so disposed that in one relative rotational position of the two elements, each opening in one element is in register with a corresponding opening in the other element, a plurality of torque transmitting balls each of which extends partially within a pair of openings in register with one another with the clutch engaged, and one of the two elements being provided with a plurality of ball receiving slots each of which leads into one of the torque transmitting openings of the so provided element, each slot having a portion thereof out of register with the openings of the two elements, said two elements being relatively movable axially against axially directed loading provided by a spring loaded thrust member, the arrangement being such that when more than a predetermined torque is transmitting from the driving to the driven element of the clutch, the said two elements move axially relatively against the spring loading under the reaction force from the torque transmitting balls to disengage the latter from the said openings and permit of the balls moving along their respective slots into a disengaged position in which the balls are out of register with the openings in both sets of elements.

Two forms of overload clutch of the foregoing kind are described in prior United States Patents Nos 3,095,955 and 3,185,275.

With the particular form of overload clutch described in the prior specifications aforementioned, the ball receiving slots are provided either in a member such as a disc connected to one of the two clutch elements so as to rotate therewith, or are formed in one of the two elements itself.

Whichever arrangement according to the prior specifications is adopted, when the balls advance along the slots into their disengaged position, axially opposite sides of the balls will still have rolling engagement with the aforementioned oppositely directed faces of the driving and driven element so long as the driving element continues to rotate relative to the driven element. As the slots are provided in one of the two clutch elements or are provided in a member, i.e. a disc connected to one of the two elements of the clutch, when the clutch is disengaged, some relative sliding movement will occur between the balls and the sides of and more especially the ends of the slots, which sliding movement over a period of time is likely to result in undesirable wear of the balls as well as of the sides and particularly the ends of the slots themselves if, as often happens, the power supply is not immediately cut off when the disengagement of the clutch first occurs.

Although this undesirable effect can be minimised by making the slots of a width greater than the diameter of the balls as described in the first mentioned of the above two patent specifications, so as to minimise wear of the sides of the slots, there is still a risk that the balls may undesirably engage with one side of and certainly with the adjacent end of each slot when in the disengaged position, so as to produce relative sliding movement between the balls and the slots.

The relative sliding movement really arises from the fact that if a ball is disposed between two relatively rotating members having opposed plane surfaces with which the ball is in rolling engagement, there will necessarily be relative linear movement and thus relative sliding engagement between the ball and any part of one of these two members which projects above the plane surface thereof, so as to be engaged by the ball at a position intermediate the two plane surfaces.

The foregoing undesirable wear is particularly noticeable if the clutch, as is not unfrequently the case in certain applications, is used under relatively high speed conditions e.g. of the order of 3,000 to 4,000 r.p.m.

The present invention has for its object the provision of an improved arrangement by which this undesirable wear is minimised.

According to the present invention the slots are provided in one of the two elements aforesaid of the clutch, with one portion of the several slots constituting the torque transmitting ball engaging openings of such element, and the slots extend through their associated element between opposite end faces thereof, said slotted element being disposed between the spring loaded thrust member and the other of the two elements aforesaid of the clutch, there being means mounting the thrust member for free rotational movement relative to both the driving and the driven elements of the clutch, the arrangement being such that when the clutch is in the disengaged position consequent on more than a predetermined torque having been applied thereto, the balls are in rolling contact on each of their two oppositely axially directed sides with the opposed faces of the freely rotatable thrust member and of the said other element but with the balls at an end of each slot in a position out of register with the torque transmitting openings of said other element.

In such an arrangement, when the balls move into the disengaged position so that the driven element is now stationary, but the driving element continues to rotate, the balls, in addition to having pure rolling engagement with the opposed faces of said other clutch element, and of the thrust member, will also have substantially entire rolling as opposed to sliding engagement with the sides of the slots of the slotted clutch element, since these two elements of the clutch are free to rotate relative to one another instead of the slotted member being fixed in relation to the other clutch element as in the prior specifications aforementioned. In practice, by reason of the shape of the interengaging surfaces, where the balls make contact with the slotted element there will be a little relative sliding movement between the balls and the slotted element adjacent one of each slot, but the amount of such sliding movement will be very much less than is the case with the constructions described in either of the two prior specifications.

The balls would necessarily have pure rolling engagement with the thrust member, since such member is mounted for free rotation relative to both the driving and the driven element of the clutch.

Accordingly with the present invention the amount of wear of the parts which occurs by reason of relative sliding engagement between the balls and the surfaces with which they contact in the disengaged position, is very small in comparison with the prior constructions aforementioned.

The ball engaging openings in the one clutch element are preferably constituted by circular holes or recesses of diameter less than the diameter of the balls so that these would be adapted to extend partially within the holes or recesses to engage merely with one edge thereof, which edge would preferably be of bevelled or convex form so that the balls would be adapted merely to have line contact with the edges of their respective openings, an arrangement which ensures that when the predetermined torque is reached, the balls merely roll out of the openings without any relative sliding movement occurring between the balls and the edges of their ball receiving openings, whereby wear of the parts under the maximum torque transmitting conditions obtaining at the instant of disengagement is reduced as far as possible.

The invention is illustrated in the accompanying drawings, wherein.

Figure 1:
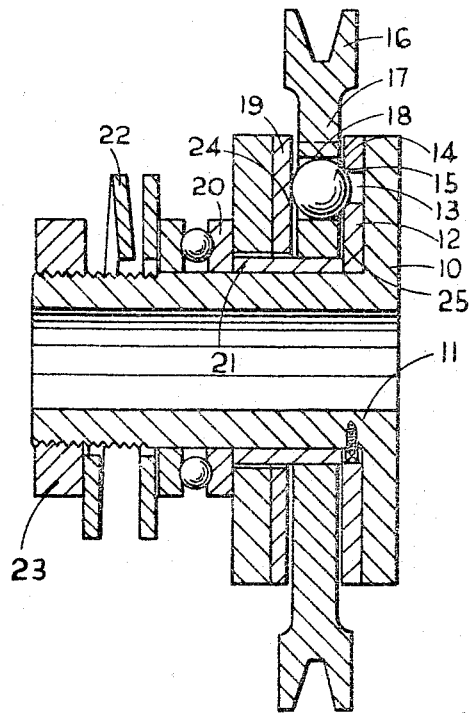
FIGURE 1 is a cross sectional view of one form of overload clutch embodying the present invention, the clutch being depicted with the various parts in the engaged position.

Referring to the drawings, the overload clutch there depicted comprises a driven clutch element 10 in the form of a flange provided on one end of a sleeve 11 which is adapted to be mounted on a shaft not shown. The driven element 10 has fixed thereto an annular driven plate 12 forming part of the driven element and provided with a number, e.g. three, through holes 13 of cylindrical form and constituting torque transmitting ball engaging openings, which holes 13 are spaced circumferentially around the plate 12. Each hole 13 is of a diameter less than that of the torque transmitting balls 14 of which the same number are provided as in the case of the holes 13.

If desired the through holes 13 may be replaced by cylindrical blind holes or recesses. Whatever arrangement is adapted the holes or recesses are adapted at one end thereof to have line engagement with the balls 14 when in torque transmitting engagement therewith, namely along the edges 15 of the holes 13. Such an arrangement permits of the balls rolling out of torque transmitting engagement with the driven element 10 without any relative sliding occurring between the balls and such element in so doing. Such effect is assisted by making the edges 15 of slightly bevelled or convex configuration.

Mounted for rotation about the sleeve 11 of the driven element 10 is a driving element 16 in the form of a pulley, the web 17 of which extends on one side of the driven element plate 12 and this web 17 is formed with three slots 18 (see FIGURES 3, 4 and 5) which extend through the element 16 between opposite sides of the web 17. Each slot may have the substantially straight or straight elongated configuration depicted respectively in FIGURES 3 and 4 or the V configuration depicted in FIGURE 5, and each slot 18 receives one of the three torque transmitting balls 14.

At the side of the web 17 opposite to the driven element plate 12 is a thrust member 19 in the form of an annular plate mounted for free rotation on the sleeve 11 through anti-friction thrust bearing 20 and bush 21. This thrust member 19 is axially slidable along sleeve 11 in a direction towards the adjacent driving element 16 and driven element plate 12 under the pressure of loading spring 22 acting between thrust bearing 20 and spring abutment 23 on sleeve 11. This spring abutment 23 is threadably mounted on sleeve 11 so as to permit of adjustment of the pressure exerted by spring 22, whereby the clutch may be set to disengage at different torques according to the spring pressure.

The web 17 has an axial thickness less than the diameter of the balls 14 so that with the clutch in the engaged position depicted in FIGURE 1, one axially directed side of each ball 14 is in engagement with the adjacent plane face 24 of the thrust member 19 and the other axially directed side of each ball is in torque transmitting engagement with the edge 15 of one of the driven element holes 13.

Figure 3:
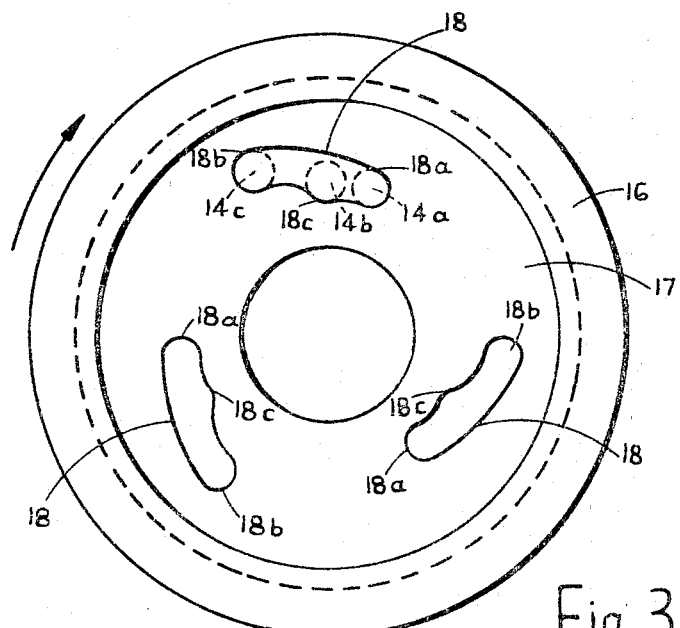
FIGURES 3, 4 and 5 are side elevations, illustrating three alternative arrangements of slots in one of the two elements of the clutch, namely, the driving element and applicable to the construction depicted in FIGURES 1 and 2.

In this position with the particular form of slots 18 depicted in FIGURE 3, each ball 14 is at one end 18a of the corresponding slot 18.

Such end 18a of each slot lies on the same pitch circle diameter as that of the ball receiving holes 13 but each slot as shown in FIGURE 3 is inclined to the adjacent circumferential direction of rotation, with its opposite end 18b lying on a pitch circle of diameter sufficiently greater than that of the holes 13 as to ensure that when the balls 14 are disposed at the ends 18b of each slot 18, they are out of register with the holes 13 and can engage only with the plane face 25 of the driven element plate 12.

The slots 18 at each end thereof have a width corresponding to that of the ball diameter so as to provide working clearance between their sides and the adjacent surface of the ball, but intermediate their two ends the slots are of increased diameter by making their radial inner edges 18c of sinusoidal or wave-like configuration in a manner clearly shown in FIGURE 3.

Thus when more than a predetermined torque is applied to the driving element or pulley 17, then under the reaction thrust of the balls 14 on the hole edges 15 and thrust member face 24, thrust member 19 moves axially away from the driven element plate 12 against the loading of spring 22 by a distance sufficient to permit of the balls 14 rolling out of this torque transmitting position (in the manner more fully described in U.S. Patent No. 3,095,955) and moving from their engaged position 14a in FIG. 3 through a disengaging position 14b where the slots 18 are locally of greater width, the balls finally moving into the fully disengaged out of register position 14c adjacent the radially outermost end 18b of the associated slots.

Figure 2:
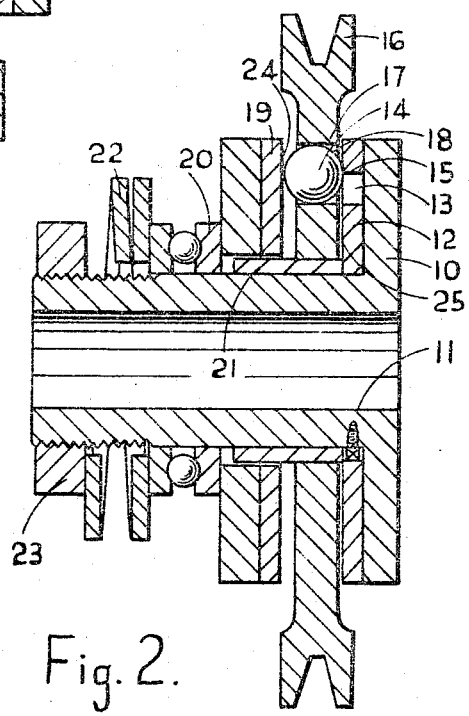
FIGURE 2 is a view similar to FIGURE 1, but showing the clutch in the disengaged position.

In this position which is also depicted in FIGURE 2, and assuming, as will usually be the case, the driving element 16 continues to rotate relative to the driven element 10, as the thrust member 19 is free to rotate about the driven element 11, the balls will have pure rolling engagement with the plane face 25 of the driven element plate 12 and with the plane face 24 of the thrust member 19, which thrust member will, under the pressure applied by its loading spring 22 to the balls 14, be constrained to rotate in the direction of rotation of the driving element 16 but at an angular velocity substantially twice that of the driving element 16. Accordingly, where the balls on their oppositely axially directed sides engage with the driven element 10 and thrust member 19, they will have only rolling contact with these two parts of the clutch and will not here be subjected to any sliding contact at all. Also as earlier explained, as the driving element 16 is itself free to rotate relative to the thrust member as well as the driven element, there will also be rolling engagement between the balls and the sides of the slots 18 in the driving element web at a position adjacent the ends of the slots 18b. There will be some relative sliding engagement as well at this position, but as the pressure exerted by the thrust member 19 is in a purely axial direction parallel to the walls of the slots 18 there will in any event be no resilient force exerted by loading spring 22, tending to force the balls into pressure contact with the walls of the slots 18, when the clutch is in the disengaged position so that any relative sliding movement which does occur between the balls and the ends of the slots 18, with the clutch disengaged, will no result in any significant wear of the so relatively engaging parts.

The locally increased width of each slot 18 at the position 18c ensures that the balls 14 are not in pressure sliding contact with the sides of the slots as they disengage from the holes 13 and thus reduces wear between the balls and the sides of the slots at the instant of disengagement.

Figure 4:
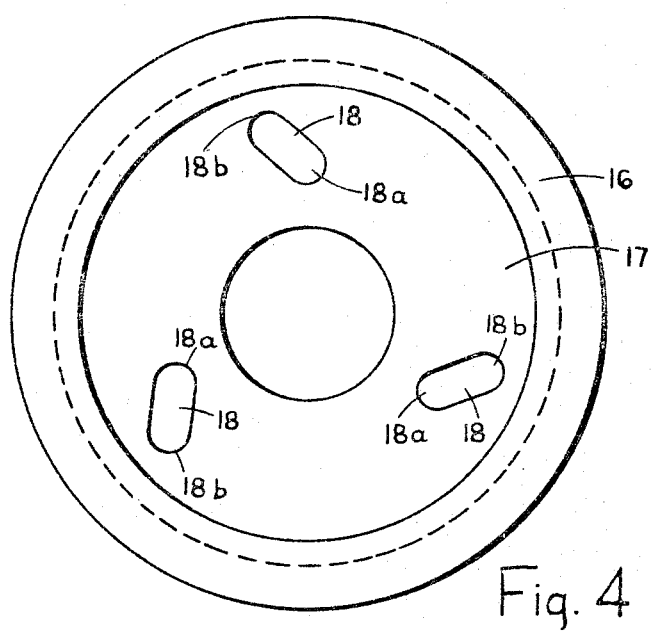
Figure 5:
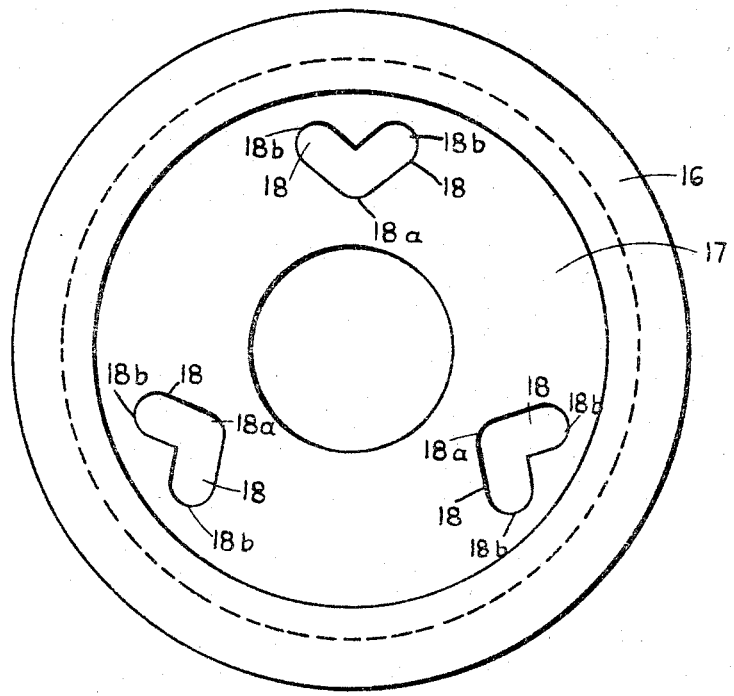

In the alternative, arrangement of slots 18 depicted in FIGURE 4, these are not locally of increased width but are otherwise similar to the arrangement depicted in FIGURE 3.

In the further alternative arrangement of slots 18 shown in FIGURE 5 these again are not locally of increased width, but are of symmetrical wide V configuration so as to provide two radially outermost end portions 18b each out of register with the ball receiving holes 13, an arrangement which unlike the case of the FIGURE 3 and 4 forms, permits of the driving element 16, in which the slots are provided, being driven in either direction. In the FIGURE 3 and FIGURE 4 constructions the driving element 16 must always be driven in a direction such as to tend to displace the balls towards the outer ends 18b of the slots, i.e. in a clockwise direction, as viewed in FIGURE 3 and as indicated by the arrow in that figure.

What I claim then is:

1. An overload clutch comprising a torque transmitting driving element and a torque transmitting driven element, a thrust member, means mounting the driving element, the driven element and the thrust member in side by side but axially spaced apart relation for relative rotational movement about a common axis of rotation, one of said elements having two axially directed opposite faces and being disposed between the other element and the thrust member, said other element and said thrust member having axially opposed mutually parallel plane faces each directed towards an adjacent one of the faces of the one element, said other element in the face thereof adjacent said one element having a plurality of circumferentially spaced torque transmitting openings having ball engaging mouths of circular configuration, said one element having a plurality of slots extending therethrough between its axially directed opposite faces with one portion of each slot in register with one of said torque transmitting openings for one relative rotational position of said elements, a torque transmitting ball within each slot, each ball having a diameter which is greater than the diameter of the torque transmitting opening mouths and the thickness of the one element adjacent said slots so that each ball projects axially beyond each of said two axially directed faces of the one element in a position for engaging with said opposed plane faces of the other element and the thrust member, each slot in the direction of its length being inclined to the direction of rotation of said one element so that part of each slot is out of register with the torque transmitting openings for all relative rotational positions of the elements, said other element and said thrust member being relatively axially movable on said mounting means, and spring means urging said other element and thrust member towards one another into thrust engagement with said torque transmitting balls.

2. An overload clutch according to claim 1 wherein the ball receiving slots are of elongated configuration with one end of each slot registering with one of the torque transmitting openings in one relative rotational position of the torque transmitting elements, each slot at a position intermediate its two ends having a width which is greater than the diameter of the balls and greater than the width of the slot at each end thereof.

3. An overload clutch according to claim 1 wherein the ball receiving slots are of substantially straight elongated configuration with substantially parallel sides one end of each slot being in register with one of torque transmitting openings in one relative rotational position of the torque transmitting elements.

4. An overload clutch according to claim 1 wherein the slots are of V configuration with the apex of the V being in register with one of the torque transmitting openings in one relative rotational position of the torque transmitting elements.

5. An overload clutch according to claim 1, wherein the torque transmitting openings are each formed as circular holes of a diameter less than the diameter of the balls.

6. An overload clutch according to claim 1, wherein the one element is the driving element of the clutch and a sleeve having a flange at one end thereof constitutes the driven element of the clutch, the sleeve constituting said mounting means whereon the slotted driving element and the spring loaded thrust member are rotatably mounted, said sleeve having a part extending beyond the thrust member in a direction away from the driven element of the clutch and having the spring means mounted thereon and an anti-friction thrust bearing mounted on said extended sleeve part between the spring means and the thrust member to transmit pressure from the spring means to the thrust member.

References Cited by the Examiner

UNITED STATES PATENTS

| 2,490,172 | 12/1949 | Swahnberg | 192—56 X |
| 2,969,132 | 1/1961 | Stewart | 192—56 |
| 2,969,133 | 1/1961 | LangHeck | 192—56 |
| 3,080,029 | 3/1963 | Stober | 192—56 |
| 3,203,523 | 8/1965 | Gilder et al. | 192—56 |

FRANK SUSKO, *Primary Examiner.*

DON A. WAITE, *Examiner.*

ARTHUR T. McKEON, *Assistant Examiner.*